United States Patent
Giori

(10) Patent No.: US 7,582,325 B2
(45) Date of Patent: Sep. 1, 2009

(54) PROCESS FOR THE PREPARATION OF TOMATO EXTRACTS WITH HIGH CONTENT IN LYCOPENE

(75) Inventor: Andrea Giori, Milan (IT)

(73) Assignee: Indena S.p.A., Milan (IT)

( * ) Notice: Subject to any disclaimer, the term of this patent is extended or adjusted under 35 U.S.C. 154(b) by 388 days.

(21) Appl. No.: 10/509,062

(22) PCT Filed: Mar. 17, 2003

(86) PCT No.: PCT/EP03/02749

§ 371 (c)(1),
(2), (4) Date: Mar. 9, 2005

(87) PCT Pub. No.: WO03/079816

PCT Pub. Date: Oct. 2, 2003

(65) Prior Publication Data

US 2005/0153038 A1    Jul. 14, 2005

(30) Foreign Application Priority Data

Mar. 27, 2002 (IT) .......................... MI2002A0632

(51) Int. Cl.
*A23L 1/24* (2006.01)
(52) U.S. Cl. .................. 426/615; 426/478; 426/481; 426/651
(58) Field of Classification Search ........... 426/615, 426/651, 478, 481, 74, 620, 640, 639, 658
See application file for complete search history.

(56) References Cited

U.S. PATENT DOCUMENTS

| 3,467,579 A | 9/1969 | Bianchi et al. |
| 5,858,700 A | 1/1999 | Ausich et al. |
| 2003/0044495 A1 * | 3/2003 | Kagan et al. ................ 426/250 |

FOREIGN PATENT DOCUMENTS

| EP | 0 818 225 | 1/1998 |
| EP | 0 986 963 | 3/2000 |
| EP | 1 103 579 | 5/2001 |
| EP | 1 201 762 | 5/2002 |
| WO | WO 95 16363 | 6/1995 |
| WO | WO 96 13178 | 5/1996 |
| WO | WO 97 48287 | 12/1997 |
| WO | WO 02 072509 | 9/2002 |
| WO | WO 03 038064 | 5/2003 |

OTHER PUBLICATIONS

Database WPI, Section Ch, Week 199916, Derwent Publications Ltd., London, GB; AN 1999-186185, XP002247814 & jp 11 035444 A (Nikko Chem Co Ltd), Feb. 9, 1999 abstract.
Database WPI, Section Ch, Week 200032, Derwent Publications Ltd., London, GB; AN 2000-373965, XP002217815 & RU 2 112 777 C (Uralbiofarm Stock Co), Jun. 10, 1998 abstract.
Database WPI, Section Ch, Week 200203, Derwent Publications Ltd., London, GB; AN 2002-017919, XP002247816 & CN 1 298 904 A (Shengminghong Sci & Technology Investmen), Jun. 13, 2001 abstract.

* cited by examiner

*Primary Examiner*—Helen F Pratt
(74) *Attorney, Agent, or Firm*—Young & Thompson

(57) ABSTRACT

A process for the extraction of lycopene from whole tomatoes, in which process tomatoes are heat concentrated and extracted with water-saturated ethyl acetate.

14 Claims, No Drawings

PROCESS FOR THE PREPARATION OF TOMATO EXTRACTS WITH HIGH CONTENT IN LYCOPENE

FIELD OF THE INVENTION

The present invention relates to a process for the preparation of tomato extracts with high content in lycopene.

TECHNICAL BACKGROUND

Lycopene is a natural pigment, particularly abundant in tomatoes and watermelon, having intense red color. Due to this characteristic, as well as its safety and beneficial effects, lycopene is widely used in the food industry as a coloring agent, usually in the form of oleoresin, i.e. a suspension in natural lipids. In this form, lycopene oxidation (crystalline lycopene being highly unstable) and bacterial degradation are prevented, most likely due to the lipids and natural antioxidants present. Furthermore, lycopene is used as food supplement thanks to its antioxidative and chemoprotective properties.

Although lycopene can be prepared by synthesis [Karrer et al., *Helv. Chim. Acta* 33, 1349 (1950); Isler et al., ibid. 39, 463 (1956)], it is usually obtained by extraction from tomatoes (*Lycopersicum esculentum*). As lycopene has intense red color only when in the crystalline form, the extraction process should allow to obtain the product in this form.

To date, the suggested methods (WO 95/16363 and WO 97/48287) comprise the separation of the serum from the pulp, and the extraction of the latter with solvents. In WO 97/48287 tomatoes, before pulp-serum separation, which has to be performed under controlled conditions, are subjected to heat treatment; the extraction is carried out in the hot as well.

Although these processes may be used with any type of tomatoes, the lycopene starting content should preferably be above 50 ppm.

DETAILED DISCLOSURE OF THE INVENTION

The present invention relates to a process for the preparation of tomato whole extracts with lycopene content from 5% to 20% and with reducing sugars content, expressed as glucose, below 1%, which process comprises the following steps:

a) pretreating fresh tomatoes, which comprises washing, then cutting or crushing;

b) heat concentrating of the cut or crushed tomato from step a);

c) extracting the concentrate from step b) with water-saturated ethyl acetate;

d) backwashing the extract from step c) with water;

e) concentrating the extract to dryness under reduced pressure.

Pre-treatment is carried out according to conventional techniques and any method providing a homogeneous cut/crushed tomato will be suitable.

Concentration (step b) is carried out by distillation under reduced pressure, at temperatures ranging from 40 to 70° C., preferably at 50° C., so that the weight of the cut/crushed tomato will be 20-30% the starting value.

Extraction of the concentrate (step c) is repeatedly performed with water-saturated ethyl acetate in a volume ranging from 1.0 to 2.5, preferably 2, times the weight of the concentrate, to obtain a lycopene-free residue. According to a preferred embodiment of the invention, the extraction is repeated four times. The extraction is carried out for at least one hour at room temperature, shielding from light and keeping the concentrate-solvent mixture under stirring.

Each extract is washed with water (step d), preferably in half the volume of the solvent used for each single extraction, after that the extracts are combined, filtered and evaporated to dryness under reduced pressure (step e). Washing with water is mandatory for the success of the process; it has in fact been observed that, when this step is omitted, as illustrated in detail in the subsequent example 3, a higher amount of whole extract is obtained which has however percent lycopene content lower by about one third (approximately 4% instead of 6%, for tomatoes containing 50 ppm of lycopene).

Furthermore, the process of the invention allows to obtain crystalline lycopene, with purity higher than 50%, from which the oleoresin can be prepared. For this purpose, steps a)-d) are carried out as described above, whereas at step e) the extract is concentrated to a final volume ranging from 0.10 to 0.28% with respect to the starting volume. The concentrated extract is then left to stand for some hours and the lycopene crystalline precipitate is filtered off and dried (step f). The resulting crystalline lycopene may optionally be suspended in ethanol, then filtered and washed with ethyl acetate until obtaining the desired purity. The oleoresin is obtained by adding seed oil to the lycopene crystals, preferably tomato seed oil or soybean oil (step g).

Advantageously, the process according to the present invention provides good yields even when using tomatoes with low starting content in lycopene and it allows to obtain a whole extract with high lycopene content, ranging from 5% to 20%, which is about twice higher that obtained with the method disclosed in WO 97/48287, as illustrated in the Comparison Example below. This process is also advantageous in that the reducing sugars content in the extract is always lower than 1%, usually lower than 0.5%.

The invention is illustrated in greater detail by means of the following examples.

EXAMPLE 1

Preparation of the Extract According to the Invention 52 kg of fresh tomatoes with lycopene content 50 ppm are cut and homogenized in a blender.

Part of water (34 L) is distilled off under reduced pressure (20 mBar) at 60° C. and discarded, to obtain 17.8 Kg of tomato concentrate.

36 L of water-saturated ethyl acetate are poured on the concentrate and the mixture is stirred for 2 hours at room temperature, shielded from light.

After 2 hours the extract is collected and the residue is extracted again with 36 L of water-saturated ethyl acetate. The mixture is stirred for 2 hours at room temperature, shielded from light. The extract is filtered and washed in a separatory funnel with 18 L of water, which is then removed and the extract is collected.

Two extractions and two washings as described above are repeated (using 144 L of solvent totally). After filtration, the extracts are combined and concentrated to dryness under reduced pressure; the resulting tomato whole extract (38.9 g) has HPLC lycopene content of 6.05%, reducing sugars content (expressed as glucose) of 0.28%, phospholipids content of 12.97% and mono-di-glycerids content of 24.02%.

EXAMPLE 2

50 kg of fresh tomatoes with lycopene content of 150 ppm are cut and homogenized in a blender.

Part of water (31 L) is distilled off under reduced pressure (20 mBar) at 60° C. and discarded, to obtain 18.8 Kg of tomato concentrate.

40 L of water-saturated ethyl acetate are poured on the concentrate and the mixture is stirred for 2 hours at room temperature, shielded from light.

After 2 hours the extract is collected and the residue is extracted again with 40 L of water-saturated ethyl acetate. The mixture is stirred for 2 hours at room temperature shielded from light. The extract is filtered and washed in a separatory funnel with 20 L of water, which is then removed and the extract is collected.

Two extractions and two washings as described above are repeated (using 160 L of solvent totally). After filtration, the extracts are combined and concentrated to dryness under reduced pressure; the resulting tomato whole extract (37.2 g) has HPLC lycopene content of 17.8% and reducing sugars content (expressed as glucose) of 0.31%.

EXAMPLE 3

Preparation of the Extract without Backwashing with Water

Tomatoes belonging to the same lot as in Example 1, with lycopene content of 50 ppm, are used.

4.5 kg of tomatoes are cut and homogenized in a blender, then 3.3 L of water are distilled off under reduced pressure (20 mBar) at 60° C.

The resulting concentrate (1.17 kg) is extracted 4 times with 2.3 L each of (9.2 L of solvent totally), stirring each time for 2 hours at room temperature and shielding from light.

The extracts are combined, filtered and concentrated to dryness under reduced pressure. The resulting whole extract (5.09 g) has HPLC lycopene content of 4%, reducing sugars content (expressed as glucose) of 4.46%, phospholipids content of 16.51% and a mono-di-glycerids content of 14.47%.

EXAMPLE 4

Preparation of the Oleoresin in Tomato Oil

The procedure of Example 1 is followed, but concentrating the combined extracts to 200 ml final volume. The concentrated extract is left to stand overnight, shielded from light, to obtain a dark red needle crystal, which is filtered under vacuum, shielding from air, washed with ethyl acetate and dried under vacuum at 50° C., to obtain 4.23 g of crystalline lycopene with 51% purity.

The crystalline lycopene is added with 6.75 g of tomato seed oil (obtained by hexane extraction) and the mixture is stirred vigorously, to obtain 10.7 g of a fluid, homogeneous, dark red product having 19.8% lycopene content.

EXAMPLE 5

Preparation of the Oleoresin in Soybean Oil

The procedure of Example 1 is followed, but concentrating the combined extracts to a final volume of 200 ml. The concentrated extract is left to stand overnight, shielded from light, to obtain a dark red needle crystal, which is filtered under vacuum, shielding from air, washed with ethyl acetate and dried under vacuum at 50° C., to obtain 4.23 g of crystalline lycopene with 51% purity.

The crystalline lycopene is added with 6.75 g of soybean oil (obtained by hexane extraction) and the mixture is stirred vigorously, to obtain 10.7 g of a fluid, homogeneous, dark red product having 19.8% lycopene content.

EXAMPLE 6

Preparation of 9.5% Purity Lycopene

The procedure of Example 1 is followed, but concentrating the combined extracts to a final volume of 200 ml. The concentrated extract is left to stand overnight, shielded from light, to obtain a dark red needle crystal, which is filtered under vacuum, shielding from air. The solid is suspended in 80 ml of ethyl acetate and heated to 45° C. with stirring for 20 min. The mixture is then left to cool to room temperature and filtered under vacuum, shielding from air. The solid is suspended in 200 ml of ethanol and heated to 45° C. with stirring for 10 min, then filtered while hot, under vacuum and shielding from air. This procedure is repeated once more. After that, the solid is washed on the filter with 40 ml of cold ethyl acetate, then dried under vacuum at 50° C., to obtain 2.05 g of crystalline lycopene with 95% purity.

COMPARATIVE EXAMPLE

Extraction According to the Method Described in WO 95/16363

Tomatoes belonging to the same lot as in Example 1, with lycopene content of 50 ppm, are used.

5.14 Kg of tomatoes are cut and homogenized in a blender, then centrifuged at 3000 r for 15', to separate serum from the insoluble fraction (1.315 kg), which is extracted 4 times with 2.65 L each of ethyl acetate (10.6 L of solvent totally), each extraction during 2 hours, under stirring, at a temperature of 60° C. and shielding from light.

The extracts are combined and concentrated to dryness under reduced pressure. The resulting tomato whole extract (6.07 g) has HPLC lycopene content of 3.5%, reducing sugars content (expressed as glucose) of 8.74%, phospholipids content of 35.57% and mono-di-glycerids content of 12.44%.

The invention claimed is:

1. A process for the preparation of whole tomatoes extracts with lycopene content from 5% to 20% and with reducing sugars content expressed as glucose lower than 1%, comprising the following steps:
   a) pretreating fresh tomatoes, which comprises washing, then cutting or crushing;
   b) heat concentrating of the cut or crushed tomato from step a);
   c) extracting the concentrate from step b) with water-saturated ethyl acetate;
   d) backwashing the extract from step c) with water; and
   e) concentrating the extract to dryness under reduced pressure.

2. A process as claimed in claim 1, wherein the concentration of the extract according to step e) is carried out to a final volume ranging from 0.10 to 0.28% with respect to the starting volume, further comprising the following steps:
   f) filtering and drying lycopene precipitated from the concentrate; and optionally suspending lycopene in ethanol or ethyl acetate, then filtering and washing with ethyl acetate until obtaining the desired purity; and
   g) adding seed oil to the lycopene from step f).

3. A process as claimed in claim 2, wherein the seed oil is tomato seed oil.

4. A process as claimed in claim 2, wherein the seed oil is soybean oil.

5. A process as claimed in claim 1, wherein the heat concentrating of step b) is carried out at 40° C. to 70° C., so that a weight of the cut or crushed tomatoes will be 20-30% of a starting value.

6. A process as claimed in claim 1, wherein the heat concentrating of step b) is carried out at 50° C., so that a weight of the cut or crushed tomatoes will be 20-30% of a starting value.

7. A process as claimed in claim 1, wherein the heat concentrating of step b) is carried out under reduced pressure.

8. A process as claimed in claim 7, wherein the reduced pressure is 20 mBar.

9. A process as claimed in claim 1, wherein the extracting the concentrate step c) is repeatedly performed with the water-saturated ethyl acetate at a volume ranging from 1.0 to 2.5 times a weight of the concentrate.

10. A process as claimed in claim 1, wherein the extracting the concentrate step c) is repeatedly performed with the water-saturated ethyl acetate at a volume of 2 times a weight of the concentrate.

11. A process as claimed in claim 1, wherein the extracting the concentrate step c) is carried out for at least an hour at room temperature shielded from light.

12. A process as claimed in claim 1, wherein the backwashing step d) is carried out with the water having half a volume of the water-saturated ethyl acetate of step c).

13. A process as claimed in claim 1, wherein in step e) the extract is concentrated to a final volume ranging from 0.10% to 0.28% with respect to a starting volume.

14. Whole tomato extracts with lycopene content from 5% to 20% and with content in reducing sugars, expressed as glucose, lower than 1% obtainable with the process of claim 1, the whole tomato extract including:

0.28-4.46% reducing sugars, 12.97-16.1% phospholipids, and 14.47-24.02% mono-di-glycerides.

* * * * *

UNITED STATES PATENT AND TRADEMARK OFFICE
CERTIFICATE OF CORRECTION

PATENT NO. : 7,582,325 B2  Page 1 of 1
APPLICATION NO. : 10/509062
DATED : September 1, 2009
INVENTOR(S) : Andrea Giori It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 885 days.

Signed and Sealed this

Fourteenth Day of September, 2010

David J. Kappos
*Director of the United States Patent and Trademark Office*